United States Patent [19]

Sattler

[11] 4,307,448
[45] Dec. 22, 1981

[54] METHOD AND A CIRCUIT ARRANGEMENT FOR EXPANDING THE ADDRESSING CAPACITY OF A CENTRAL UNIT, IN PARTICULAR OF A MICROPROCESSOR

[75] Inventor: Walter Sattler, Munich, Fed. Rep. of Germany

[73] Assignee: Siemens Aktiengesellschaft, Berlin & Munich, Fed. Rep. of Germany

[21] Appl. No.: 83,233

[22] Filed: Oct. 10, 1979

[30] Foreign Application Priority Data

Oct. 23, 1978 [DE] Fed. Rep. of Germany ....... 2846054

[51] Int. Cl.³ .............................................. G11C 8/00
[52] U.S. Cl. .................................................. 364/200
[58] Field of Search ... 364/200 MS File, 900 MS File

[56] References Cited

U.S. PATENT DOCUMENTS 3,425,036  1/1969  Packard ............................ 364/200
4,037,211  7/1977  Ikuta et al. ....................... 364/200

Primary Examiner—Raulfe B. Zache
Attorney, Agent, or Firm—Hill, Van Santen, Steadman, Chiara & Simpson

[57] ABSTRACT

A method and circuit arrangement for expanding the addressing capacity of a central unit, in particular of a microprocessor, beyond the address capacity given by the address stock of an instruction counter provides for the use of at least one base address of the central unit in order to bring about the emission of additional address bits which are combined with the address bits of the base address to form an extension address. The invention may be advantageously practiced in the central unit of a teleprinter private branch exchange.

7 Claims, 1 Drawing Figure

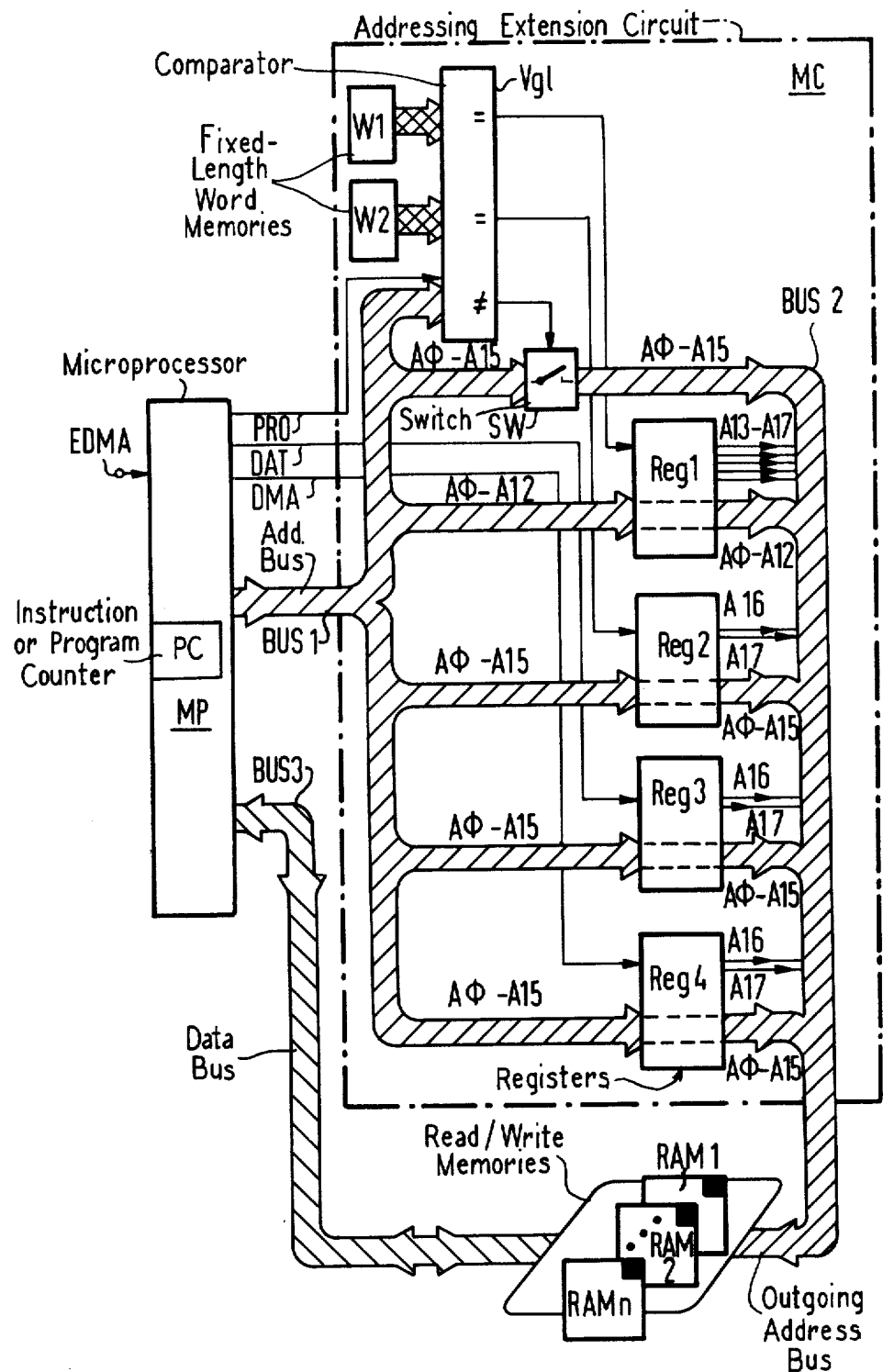

METHOD AND A CIRCUIT ARRANGEMENT FOR EXPANDING THE ADDRESSING CAPACITY OF A CENTRAL UNIT, IN PARTICULAR OF A MICROPROCESSOR

BACKGROUND OF THE INVENTION

1. Field of the Invention

The present invention relates to a method and to a circuit arrangement for expanding the addressing capacity of a central unit, in particular of a microprocessor, beyond the base address capacity defined by the address stock of an instruction counter.

2. Description of the Prior Art

As is well known in the art, the instruction counter of a central unit, such as a microprocessor, only has a limited address stock. With the addresses of this address stock individual program steps or instructions to perform defined operations can be offered. If addresses are required over and above this stock of addresses, one can provide a plurality of central units or microprocessors with corresponding instruction counters and split the functions to be performed between the two central units. This involves a circuit expense which is sometimes undesirable.

SUMMARY OF THE INVENTION

Consequently, the object of the present invention is to provide, by way of a method and circuit arrangement of the type generally mentioned above, that the addressing capacity of a central unit, in particular of a microprocessor, can be expanded in a relatively simple manner beyond the address capacity defined by the address stock of the instruction counter, without the necessity of two or more central units.

The above object is achieved with the method of the type generally mentioned above, and in accordance with the present invention, in that at least one base address of the central unit is used to bring about the emission of the additional address bits which are combined with the address bits of the base address in question to form an extension address dependent on the base address being related to a program to be called up or performed or to data to be transmitted.

In practicing the present invention, the advantage is gained that the address stock of the instruction counter of the central unit or microprocessor can be handled in a relatively simple manner so that a substantially larger number of program steps or instruction steps can be carried out than with the aid of the base addresses of the instruction counter belonging to the base address stock alone.

Expediently, the correlation of the base address combining with additional address bits to a program is established with the aid of a comparator in which the base address in question is compared with predetermined, fixed addresses, and by which, upon establishing a match between the compared addresses, the emission of the additional address bits in question is effectively controlled. This makes the provision of the additional address bits possible in a particularly simple manner.

In order to carry out the method of address expansion in accordance with the present invention it is advantageous to use a circuit arrangement in which a number of registers are connected by their respective inputs to an address bus carrying the base addresses, these registers being connected by an additional control input in each case either to a separate control line or to the output of the comparator which, in each case, when the base address appearing on the address bus is found to match at least one predetermined, fixed address, emits a control signal. An associated register, controlled by a control signal, emits additional address bits over and above the address bits of the base address fed thereto on the input side to form an extension address with the base address. If the base address emitted does not match the predetermined, fixed address concerned, this base address can be passed on, unchanged by the comparator arrangement involved. This results in the advantage of particularly low cost in terms of circuitry for the formation of extension addresses from base addresses emitted by the instruction counter and not all the bits of the base addresses emitted by the instruction counter are required to form extension addresses in every case.

Advantageously, the base addresses are used to address a first memory and the extension addresses are used to address further memories. This provides a particularly simple and clear memory structure which is advantageous. Therefore, in a simple manner, it is possible to store certain base program data in the first memory and to accommodate the program data needed to carry out special operations in the further memories.

Also advantageously, after completion of the operation associated with the extension address in question, the memory associated with the next base address or extension address is actuated by addressing. This provides the advantage that the further memories can also be included in the formation of extension addresses.

Expediently, in the course in reading information comprising a plurality of words or bytes from an address memory, the base address just made available can be extended in conjunction with additional address bits prepared separately to form an extension address for a direct memory access by emitting a direct memory access instruction during the time span between the reading of two such words or bytes. The reading of further words or bytes from the memory address before the appearance of the direct memory access instruction in question can then be resumed after completion of the direct memory access instruction. This results in the advantage that direct memory access is also made possible in a particularly simple manner without this leading to increased control costs for information reading from the memories.

BRIEF DESCRIPTION OF THE DRAWING

Other objects, features and advantages of the invention, its organization, construction and mode of operation will be best understood from the following detailed description, taken in conjunction with the accompanying drawing, on which there is a single FIGURE which illustrates, in schematic logic form, a circuit arrangement of an embodiment of the present invention.

DESCRIPTION OF THE PREFERRED EMBODIMENTS

Referring to the drawing, a circuit arrangement of a preferred embodiment of the invention comprises three parts. The first part is formed by a microprocessor MP constituting a central unit; the second part is formed by an addressing extension circuit MC; and the third part is formed by a series of memories RAM1, RAM2 . . . RAMn. These memories may be read/write memories, and, as indicated by the reference characters, may be what are known in the art as random access memories.

The microprocessor MP is connected to the input of the addressing extension circuit MC by means of an address bus BUS1 which comprises a plurality of lines. Included within the addressing extension circuit MC, the address bus BUS1 leads to the inputs of, in the present case, four registers Reg1, Reg2, Reg3 and Reg4. Whereas only 13 address lines (A$\phi$–A12) of the address bus BUS1 lead to the register Reg1, 16 address lines (A$\phi$–A15) lead to the inputs of the remaining registers Reg2, Reg3 and Reg4. In addition, 16 address lines (A$\phi$–A15) of the address bus BUS1 lead to one input side of a comparator Vg1 and to the input side of a switch SW. The switch SW may be constructed so as to include a separate switch element for each addressing line.

The comparator Vg1 is connected by further inputs through a corresponding number of lines to two fixed-length word memories W1, W2. These fixed-length word memories W1, W2 feed the comparator Vg1 with fixed words which the comparator Vg1 compares with the addresses supplied by the address bus BUS1. These addresses are the base addresses that are emitted along the address bus BUS1 and, in particular, those from the instruction counter PC of the microprocessor MP, which is also to be regarded as a program counter. Depending on the outcome of the comparison, at one of its outputs indicated on the drawing, the comparator Vg1 emits an output signal which, for example, may be constituted by a binary signal "H". At the output marked $\neq$ the comparator Vg1 then emits a corresponding output signal when the base address fed thereto on the input side matches none of the predetermined, fixed words. In response to this output, the switch SW is closed so that the address bits A$\phi$–A15 fed thereto are passed on via the switch SW to the read/write memories RAM1-RAMn. These addresses are then used to address one of the memories, for example the memory RAM1. Then, the microprocessor MP can make contact through the further bus BUS3 with the memory RAM1, just addressed, for the execution of read and/or write operations. Therefore, the bus BUS3 constitutes a data bus.

However, when the comparator Vg1 finds a match between a base address just emitted along the address bus and one of the fixed words, the corresponding output signal (binary signal "H") will appear at one of the two outputs marked = of the comparator Vg1. In this case, the switch SW remains open. The binary signal "H" appearing in this case at the corresponding output of the comparator Vg1 causes the actuation of the appertaining register Reg1 or Reg2. In the case of the register Reg1, the signal in question has the effect of ensuring that, first of all, the address bits A$\phi$–A12 of the base address just emitted are passed on unchanged, i.e. passed straight through the register Reg1 so to speak, and that in addition to these bits A$\phi$–A12, four further address bits A13-A17 are made available which combine with the address bits of the base address passed through to form an extension address. This extension address is emitted along the outgoing address bus BUS2 to the read/write memories and are there used for addressing the memory RAM2 for example.

In the event that the register Reg2 is actuated by an output of the comparator Vg1, the address bits A$\phi$–A15 present at that moment are passed straight through the register Reg2 unchanged, and in addition the register Reg2 emits further address bits A16 and A17, which are combined with the address bits A$\phi$–A15 to form an extension address with the aid of which any one of the memories, for example the memory RAMn, is then actuated.

Whereas the activation of the two registers Reg1, Reg2 is dependent on the emission of corresponding control signals from the comparator Vg1 and the activation of the comparator is dependent on a separate program instruction PRO which the microprocessor emits along a correspondingly marked line,--the program instruction indicates that the address in question relates to a program—the registers Reg3 and Reg4 can be activated by a so-called data instruction DAT or by a direct memory access instruction DMA, respectively; these instructions appear on correspondingly marked lines. They indicate the correlation of the extension address to be formed in each case. In the case of the register Reg3, through the appearance of such a data instruction DAT the address bits A$\phi$–A15 of the base address are passed through the register Reg3 and combined with two address bits A16, A17 emitted separately to form an extension address. The same is also true for the register Reg4 when the direct memory access instruction DMA appears.

With respect to the registers Reg1-Reg4 illustrated on the drawing, it should also be pointed out that the emission of the additional address bits by these registers will be fixed according to the existing memory structure. Here, it should be clear that merely through the provision of the additional address bits, the microprocessor MP is assured an addressing capacity which exceeds that defined by the address stock of the instruction or program counter PC. To effect an even more extensive expansion of the addressing capacity, one could proceed in principle such that when certain areas of the individual memories are actuated, additional criteria for the provision of even more address bits are released in order to then form an even greater number of extension addresses in a manner corresponding to that previously described. In any case, the result is achieved with just one microprocessor or just one central unit.

In connection with the actuation of the register Reg4 by a direct memory access instruction, it should also be noted that the implementation of such instructions will be coordinated with the processing of instructions in the microprocessor MP so that such an instruction is made possible between the reading of two words or bytes from a memory just addressed. Moreover, it will have to be ensured that on completion of the direct memory access the operation started before the appearance of such an instruction is resumed again. To this end, a corresponding release instruction is fed to an input EDMA of the microprocessor MP.

Finally, it should also be pointed out that the circuit arrangement set forth above can preferably be used in the central control section of a telegraphic private branch exchange, which thus offers a simple possibility for expansion with regard to the number of subscriber teleprinter machines or teleprinter lines or data lines connected thereto.

At this point it should also be mentioned that, in principle, the mentioned capacity for expansion might certainly by attained by using another instruction or program counter for the central unit; however, this presupposes that one has access to such a counter. Such access is not always possible, however, in any case not if the central unit is constituted by a microprocessor.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for extending the addressing capacity of a central unit beyond the multi-base address capacity defined by the address stock of an instruction counter, said central unit operable to emit base addresses and instructions related to operations to be carried out, said circuit arrangement comprising:

an address bus connected to the central unit for carrying base addresses;

an outgoing address bus;

fixed word memory means, comprising a plurality of fixed word memories, operable to produce a plurality of data words;

a program instruction line connected to the central unit for carrying a program instruction control signal;

a comparator connected to said address bus, to said fixed word memory means and to said program instruction line and operable to produce an output signal in response to a match between a base address and a data word during the presence of said program instruction control signal; and extension memory means connected between said address bus and said outgoing address bus and connected to said comparator, said extension memory means including a plurality of memories each storing a different number of additional address bits and operable in response to said output signal to switch through the base address and combine therewith the stored additional bits to form an extension address on said outgoing address bus, said comparator including a plurality of outputs associated with respective fixed word memories for carrying said output signal and connected to respective extension memories to associate the extension and fixed word memories.

2. The circuit arrangement of claim 1, and further comprising:

switch means for connecting said address bus to said outgoing address bus;

said comparator operable to produce another output signal in response to the lack of a match, said switch means connected to said comparator to receive said other signal and activated thereby to interconnect said buses.

3. The circuit arrangement of claim 2, and further comprising:

a plurality of registers each storing additional address bits, some of said registers constituting said extension memories which are connected to said comparator, others of said registers connected between said address bus and said outgoing address bus, each of said other registers are also connected to the central unit to receive a respective instruction as a control signal to cause the respective register to switch through a base address and combine therewith the respective additional address bits on said outgoing address bus.

4. The circuit arrangement of claim 3, and further comprising:

a data bus connected to the central unit for bidirectional data transmission; and read/write memory means connected between said outgoing address bus and said data bus and accessed by the address on the outgoing address bus to communicate with the central unit.

5. The circuit arrangement of claim 4, wherein:

said read/write memory means comprises a plurality of memories one of which is assigned to and accessed by a base address received via said switch means.

6. The circuit arrangement of claim 5, during communications between the central unit and said read/write memory means in which a plurality of words or bytes are being read from an addressed memory, said circuit arrangement further comprising:

means operable during the time span between two read words or bytes to produce a direct memory access instruction to activate a respective one of said other registers and operable to cause a resumption of reading after completion of direct memory access.

7. A method of expanding the addressing capacity of a central unit beyond the base address capacity defined by the address stock of an instruction counter, comprising the steps of:

generating an address expansion command;

generating a multi-bit base address which is related to an operation to be performed;

generating an instruction related to the operation to be performed; and only when an expansion command has been generated, generating additional address bits and combining the same with at least some of the base address bits in response to the base address and the instruction to form an extension address for carrying out the operation to be performed, including comparing the base address with a plurality of predetermined fixed addresses, and in response to a match between a base address and a fixed address, generating the additional address bits and adding such additional bits to the base address bits.

* * * * *